United States Patent [19]

Tsan-Yun et al.

[11] Patent Number: 5,358,540
[45] Date of Patent: Oct. 25, 1994

[54] EXHAUST CLEANER FOR FILTER HOODS

[76] Inventors: Chang Tsan-Yun, E402 No. 13, Wu-Chuan 1 Rd., Hsin Chuang City, Taipei Hsien; Chen-Shing Wu, No. 104, San Jun St., Shulin Chen, Taipei Hsien, both of Taiwan

[21] Appl. No.: 171,703

[22] Filed: Dec. 22, 1993

[51] Int. Cl.$^5$ .............................................. B01D 47/02
[52] U.S. Cl. ........................................ 55/227; 55/228; 55/233; 55/256; 55/DIG. 36; 126/299 E
[58] Field of Search .................. 55/223, 228, 233, 255, 55/256, 269, DIG. 36, 227, 229; 126/299 D, 299 E

[56] References Cited

U.S. PATENT DOCUMENTS

| | | | |
|---|---|---|---|
| 3,647,358 | 3/1972 | Greenberg | 55/256 X |
| 3,756,580 | 9/1973 | Dunn | 55/256 X |
| 4,900,341 | 2/1990 | Csabai | 55/233 X |

*Primary Examiner*—Charles Hart
*Attorney, Agent, or Firm*—Bacon & Thomas

[57] ABSTRACT

An exhaust cleaner includes a water trough installed in the exhaust piping of a filter hood through which exhaust gas from the filter hood passes, a water heater controlled to heat water in the water trough, a chemical detergent added in water in the water trough, a waste grease collector disposed outside the water trough to collect solid suspension particles from the water trough.

3 Claims, 2 Drawing Sheets

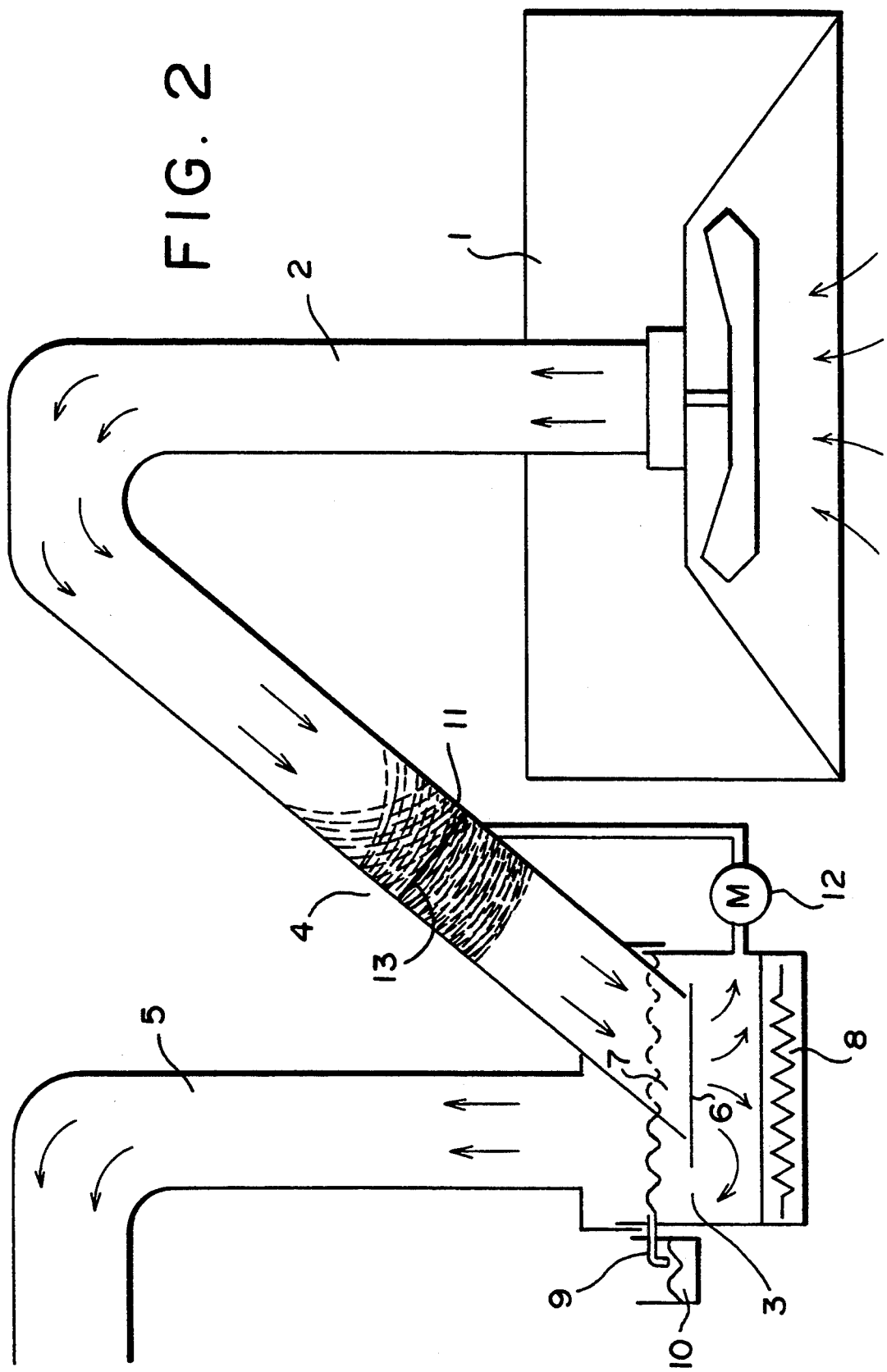

EXHAUST CLEANER FOR FILTER HOODS

BACKGROUND OF THE INVENTION

The present invention relates to an exhaust cleaner installed in the exhaust piping of a filter hood to remove solid particles from exhaust gas.

A variety of filter hoods have been disclosed for use to draw smoke, grease and odor laden air out of work area, and have appeared on the market. Because conventional filter hoods simply remove exhaust gas from work area into the air, they pour tons of pollutant into the atmosphere.

SUMMARY OF THE INVENTION

The present invention has been accomplished to provide an exhaust cleaner for filter hoods which eliminates the aforesaid problem. According to one aspect of the present invention, the exhaust cleaner comprises a water trough installed in the exhaust piping of a filter hood through which exhaust gas from the filter hood passes, a water heater controlled to heat water in the water trough, a chemical detergent added in water in the water trough. When exhaust gas passes from the filter hood through the water trough, solid substances are carried away from exhaust gas by water and then suspended in water in the water trough.

According to another aspect of the present invention a waste grease collector is disposed outside the water trough to collect solid suspension particles from the water trough.

BRIEF DESCRIPTION OF THE DRAWINGS

The present invention will now be described by way of example with reference to the annexed drawings, in which:

FIG. 2 shows an alternate form of the present invention.

DETAILED DESCRIPTION OF THE PREFERRED EMBODIMENTS

Figure 1:
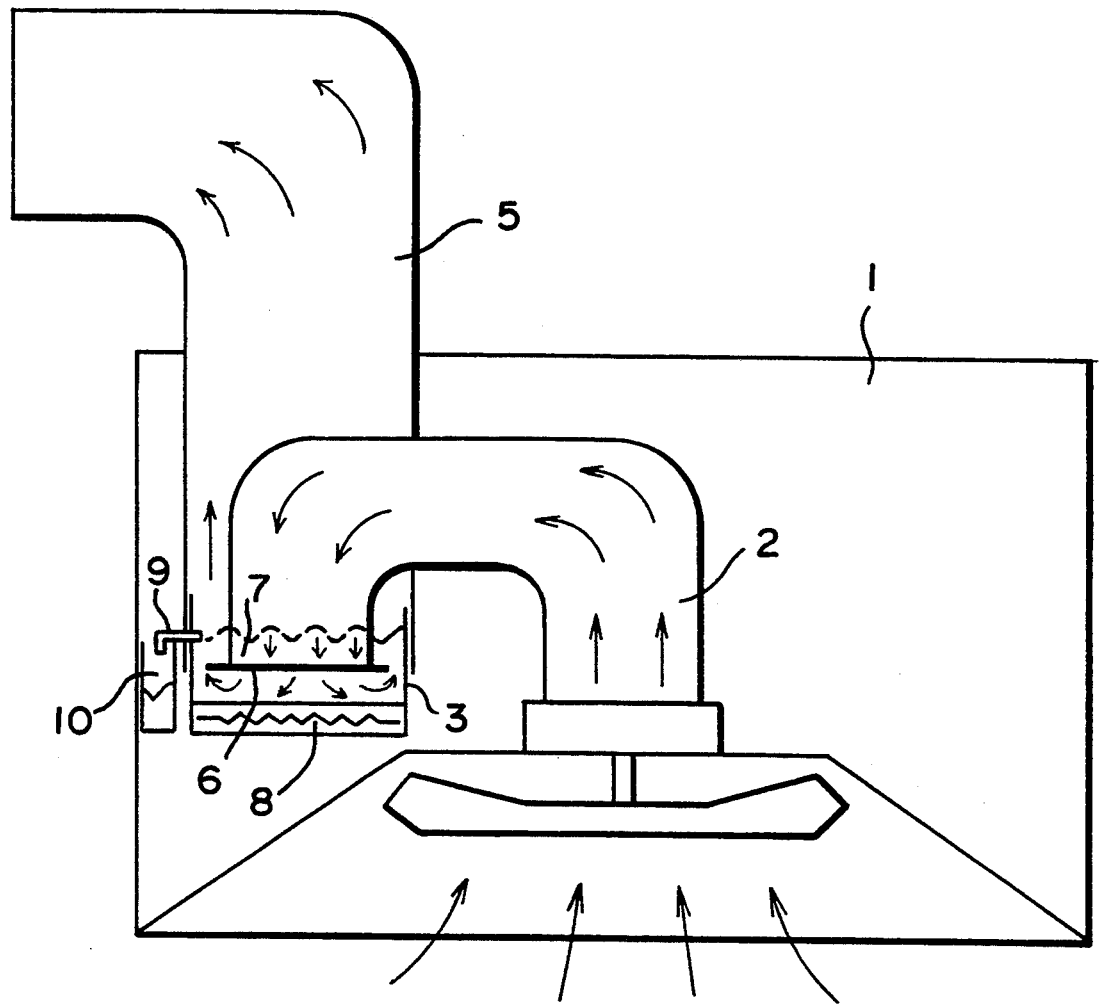
FIG. 1 is a plain view showing the present invention installed.

Referring to FIGS. 1 and 2, an exhaust cleaner in accordance with the present invention is generally comprised of a water trough 3 mounted inside the connecting area between the ducted outlet 2 of an filter hood 1 and the exhaust pipe 5. The water trough 3 and the water sprayer 4 may be installed inside the filter hood 1 (as shown in FIG. 1) or the ducted outlet 2 of the filter hood 1 (see FIG. 2).

Referring to FIG. 1 again, exhaust gas from the ducted outlet 2 of the filter hood 1 is directly guided into water in the water trough 3. The outlet port 7 of the ducted outlet 2 is covered with a meshed cover 6 and dipped into water in the water trough 3. When exhaust gas passes through the meshed cover 6 into water in the water trough 3, it diffuses in all direction causing grease and dirts adhered to the molecules of water in the water trough 3, and therefore particles are separated from exhaust gas. When the filter hood 1 is operated, a water heater 8 is synchronously turned on to heat water in the water trough 3. A detergent or chemical solution may be added to water in the water trough 3 which works to separate grease and dirts from the molecules of water in the water trough 3 causing grease and dirts suspended in water. Suspension substances in water in the water trough 3 will then be guided through a hole 9 into a grease collector 10. When passed through water in the water trough, exhaust gas is guided out of the house through the exhaust pipe 5. Therefore, exhaust gas exhausted from the exhaust pipe 5 causes little air pollution.

Referring to FIG. 2, there is provided a water sprayer system 4 consisted of a water pump 12 and a plurality of spray nozzles 11 and installed in the ducted outlet 2 of the filter hood 1 in front of the water trough 3. The water pump 12 pumps water from the water trough 3 to the spray nozzles 11 causing the spray nozzles 11 to send out very fine drops of water over the inside wall of the ducted outlet 2 of the filter hood 1. A meshed plate 13 may be installed in the ducted outlet 2 of the filter hood 1 at a suitable location to buffer exhaust gas from the filter hood 1 causing it mixed with fine drops of water for permitting solid particles to be carried by water into the water trough 3. A thermostatic switch may be installed to control the operation of the water heater 8 so as to maintain the temperature of water in the water trough within a limited range.

What is claimed is:

1. An exhaust cleaner comprising a filter hood having a ducted outlet connected to an exhaust pipe for drawing smoke, grease and odor laden air out of work area; and a water trough installed in said ducted outlet and having a hole connected to a waste grease collector thereof on the outside; wherein:

said ducted outlet of said filter has an outlet dipped into water in said water trough; said water trough is added with a chemical detergent and installed with a water heater controlled to heat water in said water trough.

2. The exhaust cleaner of claim 1 further comprising a water sprayer system installed in said ducted outlet between said water trough and said filter hood, said water sprayer system comprising a plurality of spray nozzles, and a water pump controlled to pump water from said water trough to said spray nozzles causing them to send out very fine drops of water over the inside wall of said ducted outlet.

3. The exhaust cleaner of 1 further comprising a plurality of meshed plates respectively disposed in said water trough and said ducted outlet to buffer exhaust gas from said filter hood.

* * * * *